3,679,427
RIGIDIZED CARBOCYANINE DYES AND PHOTOGRAPHIC EMULSIONS

Lewis L. Lincoln and Donald W. Heseltine, Rochester, N.Y., assignors to Eastman Kodak Company, Rochester, N.Y.
No Drawing. Filed Oct. 30, 1970, Ser. No. 85,708
Int. Cl. G03c 1/08
U.S. Cl. 96—120         15 Claims

ABSTRACT OF THE DISCLOSURE

Rigidized carbocyanine dyes including at least two nitrogen-containing heterocyclic nuclei with a nitrogen atom of each nucleus joined by a 5 carbon polyene chain, each heterocyclic nucleus also having the non-metallic atoms to complete, in combination with the two nitrogen atoms and the carbon atoms of the intervening polyene chain, a nucleus which is either 3,4,5a,6,7,8-hexahydro-4aH - pyrano[3,2-c; 5,6-c']dipyridine or an analog wherein the member in the 5-position is alternatively one such as a sulfur atom, a nitrogen atom, a selenium atom, etc., are useful as spectral sensitizing dyes for silver halide. Since they are structurally rigidized, their absorption envelope is more selective, and they exhibit high stability in solution and an increased fluorescence efficiency when compared to similar, but non-rigidized dyes. The high degree of fluorescence makes these compounds advantageous also as textile dyes, plastics dyes and colorant dyes for related situations including cosmetics, e.g., nail polish, facial coloring compositions, lipsticks or the like. Additionally, these rigidized carbocyanine dyes are desirable as colorants for coatings like paints, lacquers and the like when dispersed or dissolved therein.

---

This invention relates to dyes and their preparation, to dyes useful for spectral sensitization of photographic silver halide, and to carbocyanine, polymethine dyes that are rigidized i.e., wherein the methine carbon atoms and adjoining chromophoric nitrogen atoms of terminal heterocyclic nuclei are integral to a fused ring system of which each ring nucleus preferably contains six member atoms.

Dyestuffs, including carbocyanine dyes are well known in the chemical arts. They generally are known to be useful as coloring materials for such items as plastics, textile fibers, coating materials and the like. Additionally, certain dyes are known to be useful as spectral sensitizing dyes for photographic silver halide emulsions. Presently known carbocyanine dyes generally include two terminal heterocyclic nuclei joined by an open (non-cyclic) trimethine chain, although dyes are also known, for example the cyanine dyes described in U.S. Pat. 2,478,367 in which a portion of the methine chain is included in a ring system.

Open-chain polymethine dyes are capable of existing in numerous stereoisomeric configurations, and are capable of undergoing numerous rotational and translational modes of vibration. Such a potential multiplicity of form contributes both to an undesirably wide spectral absorption envelope and a decreased stability of the dye, especially in solution. Accordingly, certain simple cyanine dyes of the type described in U.S. Pat. 2,478,367, exhibit a type of rigidized structure wherein the methine carbon atoms and adjoining nitrogen atoms of the terminal heterocyclic nuclei are integrated with additional methylene groups to form a single, seven-membered heterocyclic ring. The formation of this ring contributes to a desirable narrowing of the absorption envelope for these dyes by restricting the number of distinct stereoisomers in which this rigidized dye molecule can exist. Additionally, the stability of the dye in solution is also increased, and they tend to exhibit higher fluorescence capabilities than do similar, but non-rigidized dyes. Such rigidized dyes, however, are limited to simple cyanine dyes which characteristically absorb light efficiently in a shorter wavelength portion of the spectrum, when compared to a homologous carbocyanine dye. It would be advantageous to provide rigidized dyes other than simple cyanines and having even fewer degrees of rotational and vibrational freedom. Such dyes would be expected to have enhanced fluorescence efficiencies and longer wave length absorbances.

Accordingly, it is an object of this invention to provide novel rigidized carbocyanine dyes and processes for their preparation.

It is another object of this invention to provide new rigidized carbocyanine dyes which exhibit a single geometric configuration.

It is an additional object of this invention to provide new rigidized carbocyanine dyes which exhibit narrow spectral absorption envelopes.

Still another object of this invention is to provide, for photographic purposes, new rigidized carbocyanine dyes which are useful as sensitizers for silver halide emulsions.

Yet another object of the present invention is to provide new rigidized carbocyanine dyes which exhibit high fluorescence efficiency and are useful as colorant materials.

Still another additional object of this invention is to provide novel rigidized carbocyanine dyes which are advantageous as dyes for resin materials.

It is another object of this invention to provide novel sensitized photographic emulsions utilizing new rigidized carbocyanine dyes.

Still another object of this invention is to provide resins and resin melts dyed with new rigidized carbocyanine dyes.

These and other objects of the present invention will become additionally apparent from a consideration of the following specification and appended claims.

The objects of this invention are accomplished with rigidized carbocyanine dyes including at least two nitrogen-containing heterocyclic nuclei, a polyene chain joining two of said nuclei and having five carbon atoms and a equal number of alternating single and double bonds, with three of the five carbon atoms intervening the two nuclei and a terminal carbon atom of the polyene chain being in each of the two heterocyclic nuclei and attached to a nitrogen atom thereof, and the remaining non-metallic atoms necessary to complete, in combination with the nitrogen atoms and the carbon atoms, a nucleus selected from 3,4,5a,6,7,8 - hexahydro-4aH-pyrano[3,2-c; 5,6-c'] dipyridine and analogs thereof wherein the member in the 5-position is selected from either a sulfur atom, a selenium atom, or a nitrogen atom. Of those dyes wherein the member in the 5-position is a nitrogen atom, that nitrogen can be desirably substitued with a member selected from either a hydrogen atom, an alkyl radical having from 1-6 carbon atoms, a mono- or polycyclic aryl radical having from 6 to 10 atoms in the nucleus or an amino radical.

Advantageous rigidized carbocyanine dyes of this invention include dyes having the formula:

(I)
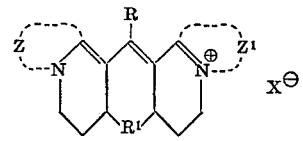

wherein:

(a) each of Z and $Z^1$ represents the non-metallic atoms necessary to complete a heterocyclic nucleus of the type used in cyanine dyes, (b) R represents a member selected from either a hydrogen atom, an alkyl radical or an aryl radical, (c) $R^1$ represents a member selected from either an oxygen atom, a sulfur atom, a selenium atom or a nitrogen atom, and (d) $X^\ominus$ represents an anion.

The non-metallic atoms represented by Z and $Z^1$ to complete a heterocyclic nucleus of the type used in the cyanine dyes include the non-metallic atoms necessary to complete a heterocyclic nucleus as in Formula I above and having therein at least one hetero atom selected from either nitrogen, oxygen, sulfur or selenium. The heterocyclic nuclei completed by Z and $Z^1$ atoms also include those containing a heterocyclic ring of from 5 to 6 nuclear atoms including a chromophoric nitrogen atom and from 4 to 5 additional atoms of which from 3 to 4 atoms are carbon atoms and wherein the remaining additional atom is selected from either carbon, nitrogen, oxygen, sulfur or selenium atoms.

Exemplary heterocyclic nuclei of the type used in cyanine dyes and completed by the non-metallic Z and $Z^1$ atoms include, for example, those nuclei of the midazole series such as benzimidazole compounds like 5-chlorobenzimidazole and also including compounds of the naphthimidazole series; those of the thiazole series like thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.; those of the benzothiazole series such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6 - methylbenzothiazole, 5 - bromobenzothiazole, 6-bromobenzothiazole, 4-phenylbenzothiazole, 5-phenylbenzothiazole, 4-methoxybenzothiazole, 5-methoxybenzothiazole, 6 - methoxybenzothiazole, 5 - iodobenzothiazole, 6-iodobenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6-hydroxybenzothiazole, etc.; those of the naphthothiazole series like alpha-naphthothiazole, 8-methoxy-alpha-naphthothiazole, 7-methoxy-alpha-naphthothiazole, etc.; those of the thionaphtheno-7',6',4,5-thiazole series such as 4-methoxythionaphtheno-7',6',4,5-thiazole, etc.; those of the oxazole series for example, 4-methyloxazole, 5-methyloxazole, 4-phenyloxazole, 4,5-diphenyloxazole, 4-ethyloxazole, 4,5-dimethyloxazole, 5-phenyloxazole, etc.; those of the benzoxazole series like benzoxazole, 5-chlorobenzoxazole, 5-methylbenzoxazole, 5-phenylbenzoxazole, 6-methylbenzoxazole, 5,6 - dimethylbenzoxazole, 4,6 - dimethylbenzoxazole, 5 - methoxazole, 5 - ethoxybenzoxazole, 5 - chlorobenzoxazole, 6 - methoxybenzoxazole, 5 - hydroxybenzoxazole, 6-hydroxybenzoxazole, etc.; those of the naphthoxazole series such as alphanaphthoxazole, etc.; those of the selenazole series, for example, 4-methylselenazole, 4-phenylselenazole, etc., those of the benzoselenazole series like benzoselenazole, 5-chlorobenzoselenazole, 5 - methoxybenzoselenazole, 5 - hydroxybenzoselenazole, tetrahydrobenzoselenazole, etc.; those of the naphthoselenazole series such as alpha-naphthoselenazole; and those of the 2-quinoline series such as quinoline, 4-methylquinoline, etc.

As defined herein, the term alkyl radical refers to straight and branched chain aliphatic radicals having from 1 to about 18 carbon atoms in the longest aliphatic chain (i.e., that chain which determines the radical nomenclature) such as methyl, ethyl, chloroethyl, propyl, isopropyl, n-butyl, isobutyl, tertbutyl, amyl, n-hexyl, n-heptyl, n-octyl, n-nonyl, n-decyl, dodecyl, tetradecyl, pentadecyl, heptadecyl, octadecyl and the like with alkyl radicals of from 1 to 8 carbon atoms being preferred. Aryl radicals are defined herein to include mono- and polycyclic aryl radicals having from 6 to 14 atoms in the nucleus, such as phenyl, p-tolyl, naphthyl, anthryl, and the like.

Heterocyclyl radicals advantageous herein include radicals having from 5 to about 14 atoms in a mono- or polycyclic nucleus and including in the nucleus at least one hetero atom such as nitrogen, sulfur, oxygen, selenium or the like.

Exemplary heterocyclyl radicals include such radicals as, for example, 5-chlorobenzimidazolyl, thiazolyl, 4-methylthiazolyl, benzothiazolyl, 4-chlorobenzothiazolyl, 5,6 - dimethoxybenzothiazolyl, 5-hydroxybenzothiazolyl, as well as imidazolyl radicals including those of the benzimidazolyl and naphthimidazolyl series, thiazolyl radicals including those of the benzothiazolyl and naphthothiazolyl series, oxazolyl radicals including those of the benzoxazolyl and naphthoxazolyl series, selenazolyl radicals including those of the benzoselenazolyl and naphthoselenazolyl series, 2-quinolyl radicals such as 2-quinolyl, 4-methyl-2-quinolyl and the like. Additional useful heterocyclyl radicals are known to those skilled in the applicable arts.

The term amino radical as used herein refers to unsubstituted amino radicals and substituted amino radicals as well, with desirable substituents including alkyl, aryl and heterocyclyl radicals like those described elesewhere herein and and additionally including substituents such as arylsulfonyl radicals like phenylsulfonyl and naphthylsulfonyl, acyl radicals like formyl, acetyl, propionyl, octadecanoyl, etc., and thiocarbamoyl radicals such as thiocarbamoyl, alkyl, dialkyl, aryl and alkylaryl thiocarbamoyl radicals wherein the alkyl and aryl moieties include alkyl and aryl radicals like those described herein.

The anions represented by $X^\ominus$ include a wide variety of anions like bromide, chloride and iodide, as well as additional anions, e.g., sulfates, including sulfate, hydrosulfate and lower alkyl sulfates like methylsulfate, aromatic sulfonates such as p-toluene sulfonate and benzene sulfonate, acid anions derived from carboxylic acids like acetate, trifluoroacetate, propionate, benzoate, and a wide variety of other anions including anions such as, for example, perchlorate, cyanate, thiocyanate, sulfamate, etc.

Especially advantageous rigidiezd carbocyanine dyes of the type described above in Formula I include those wherein (a) R represents a member selected from either a hydrogen atom, an alkyl radical having from 1 to 6 carbon atoms, an aryl radical having from 6 to 10 atoms in a mono- or polycyclic nucleus, and (b) the nitrogen atom represented by $R^1$ is substituted with a member selected from either a hydrogen atom, an alkyl radical having from 1 to 6 carbon atoms, an aryl radical having from 6 to 10 atoms in a mono- or polycyclic nucleus and an amino radical.

Additional advantageous rigidized carbocyanine dyes of this invention include those having the formulas.

(II) 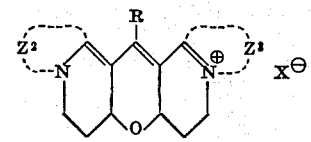

(III) 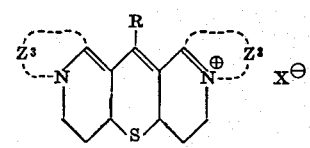

(IV) 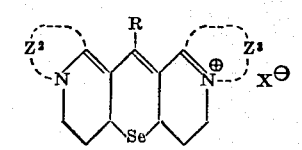

wherein:

(a) each of $Z^2$ and $Z^3$ represents the atoms necessary to complete a heterocyclic nucleus containing a heterocyclic ring of 5 to 6 atoms including the nitrogen atom with the additional atoms of the heterocyclic ring being selected from either carbon, nitrogen, oxygen, sulfur or selenium,
(b) R represents a member selected from either a hydrogen atom, an alkyl radical or an aryl radical, and
(c) $X^\ominus$ represents an anion such as those described herein.

Still additional advantageous rigidized carbocyanine dyes of the present invention include those having the formula:

(VI) 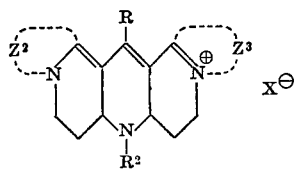 $X^\ominus$ wherein:

(a) each of $Z^2$, $Z^3$, R and $X^\ominus$ are as defined previously and
(b) wherein R represents a member selected from either a hydrogen atom, an alkyl radical having from 1 to 6 carbon atoms, an aryl radical having from 6 to 10 atoms in a mono- or polycyclic nucleus or an amino radical.

Included within the amino radicals represented by $R^2$ are amino radicals such as those having the formula

wherein:

(a) $R^3$, when taken alone, represents a member selected from either a hydrogen atom, an alkyl radical having from 1 to 4 carbon atoms or a phenyl radical,
(b) $R^4$, when taken alone, represents a member selected from either an alkyl radical having from 1 to 18 carbon atoms, a phenyl radical, a naphthyl radical, a heterocyclyl radical, an arylsulfonyl radical, an acyl radical, or a thiocarbamoyl radical, and
(c) $R^3$ and $R^4$, when taken together, represent the nonmetallic atoms necessary to complete a heterocyclyl radical having from 5 to 13 atoms in a mono- or polycyclic nucleus.

Especially advantageous rigidized carbocyanine dyes of the types described herein include such compounds as:

(a) 6,7,9,10-tetrahydro-7aH,8aH-bisbenzothiazolo [3,2-a; 3',2'-a']pyrano[3,2-c; 5,6-c']dipyridin-5-ium iodide.
(b) $R^4$, when taken alone, represents a member selected zolo[3,2-a; 3',2'-a']pyrano[3,2-c; 5,6-c']dipyridin-5-ium bromide.
(c) 6,7,9,10-tetrahydro-3,13 dimethoxy-7aH,8aH-bisbenzothiazolo[3,2-a; 3',2'-a']pyrano[3,2-c; 5,6-c'] dipyridin-5-ium iodide.
(d) 6,7,9,10-tetrahydro-17-ethyl-3,13-diphenyl-7aH,8aH-bisbenzoxazolo[3,2-a; 3',2'-a']pyranol[3,2-c; 5,6-c'] dipyridin-5-ium bromide.
(e) 2,3,13,14-tetrachloro-16,18-diethyl-6,7,9,10-tetrahydro-7aH,8aH-bisbenzimidazo[1,2-a; 1',2'-a']pyrano [3,2-c; 5,6-c']dipyridin-5-ium trifluoroacetate.
(f) 5,6,8,9-tetrahydro-3,11 diphenyl-6aH,7aH-bisthiazolo[3,2-a; 3',2'-a']pyrano[3,2-c; 5,6-c']dipyridin-4-ium bromide.
(g) 14-ethyl-5,6,8,9-tetrahydro-3,11-dimethyl-6aH,7aH-bisoxazolo[3,2-a; 3',2'-a']pyrano[3,2-c; 5,6-c']dipyridin-4-ium bromide.
(h) 5,6,8,9-tetrahydro-11-methyl-14-(1-naphthyl)-2-phenyl-6aH,7aH-oxazolo[3,2-a]selenazolo[3,2-a'] pyrano[3,2-c; 5,6-c']dipyridin-4-ium bromide.
(i) 6,7,9,10-tetrahydro-2,3,13,14-tetramethoxy-7aH,8aH-bisbenzothiazolo[3,2-a; 3',2'-a']thiopyrano[3,2-c; 5,6-c']dipyridin-5-ium bromide.
(j) 3,13-dichloro-6,7,9,10-tetrahydro-16,18-diphenyl-7aH,8aH-bisbenzimidazo[1,2-a; 1',2'-a']thiopyrano [3,2-c; 5,6-c']dipyridin-5-ium bromide.
(k) 6,7,9,10-tetrahydro-3,13-dimethoxy-17-p-methoxyphenyl-7aH,8aH-bisbenzoxazolo[3,2-a; 3',2'-a']thiopyrano[3,2-c; 5,6-c']dipyridin-5-ium bromide.
(l) 8,9,11,12-tetrahydro-9aH,10aH-dinaphth[2,1; 4,5:1,2; 4',5']oxazolo[3,2-a]selenazolo[3',2'-a'] thiopyrano[3,2-c:5,6-c']dipyridin-7-ium bromide.
(m) 5,6,8,9-tetrahydro-2,3,12-trimethyl-16-propyl-6aH, 7aH-benzoxazolo[3,2-a]oxazolo[3,2-a']thiopyrano [3,2-c:5,6-c']dipyridin-4-ium bromide.
(n) 6,7,9,10-tetrahydro-3,13-dimethyl-7aH,8aH-bisbenzoxazolo[3,2-a:3',2'-a']selenino[3,2-c:5,6-c']dipyridin-5-ium bromide.
(o) 12-chloro-16-ethyl-5,6,8,9-tetrahydro-2,3-diphenyl-6aH,7aH-benzothiazolo[3,2-a]thiazolo[3,2-a']selenino [3,2-c:5,6-c']dipyridin-4-ium bromide.
(p) 3,13-diethoxy-6,7,9,10-tetrahydro-17-methyl-7aH, 8aH-bisbenzothiazolo[3,2-a:3',2'-a']selenino [3,2-c:5,6-c']dipyridin-4-ium bromide.
(q) 8-(2-benzothiazolylamino)-6,7,8,8a,9,10-hexahydro-7aH-bis-benzothiazolo[3,2-a:3',2'-a']pyrido [3,2-c:5,6-c']dipyridin-5-ium bromide.
(r) 8-(2-benzothiazolylamino)-6,7,8,8a,9,10-hexahydro-3,13-diphenyl-7aH-bisbenzoxazolo[3,2-a:3',2'-a'] pyrido[3,2-c:5,6-c']dipyridin-5-ium bromide.
(s) 2,3,13,14-tetrachloro-16,18-diethyl-6,7,8,8a,9,10-hexahydro-3,13-diphenyl-7aH-bisbenzimidazo [3,2-a:3',2'-a']pyrido[3,2-d:5,6-c']dipyridin-5-ium iodide.
(t) 8-phenyl-6,7,8,8a,9,10-hexahydro-7aH-diquino [1,2-a:1',2'-a']pyrido[3,2-c:5,6-c']dipyridin-5-ium iodide.
(u) 8,17-diethyl-6,7,8,8a,8,10-hexahydro-7aH-bisbenzothiazolo[3,2-a:3',2'-a']pyrido[3,2-c:5,6-c']dipyridin-5-ium iodide.
(v) 3,13-dichloro-8-(N-methyl-1-naphthylamino)-6,7,8, 8a,9,10-hexahydro-7aH-bisbenzothiazolo[3,2-a:3',2'-a'] pyrido[3,2-c:5,6-c']dipyridin-5-ium bromide.
(w) 8-(N-methyloctadecylamino)-16,18-diphenyl-6,7,8, 8a,9,10-hexahydro-7aH-bisbenzothiazolo[3,2-a: 3',2'-a']pyrido[3,2-c:5,6-c']dipyridin-5-ium-p-toluenesulfonate.
(x) 7-diphenylamino-14-methyl-3,11-diphenyl-5,6,7,7a, 8,9-hexahydro-6aH-bisthiazolo[3,2-a:3',2'-a']pyrido [3,2-c:5,6-c']dipyridin-5-ium bromide.
(y) 8-(1,1-dioxo-1,2-benzisothiazol-3-ylamino)-6,7,8,8a, 9,10-hexahydro-7aH-bisbenzothiazolo[3,2-a:3',2'-a'] pyrido[3,2-c:5,6-c']dipyridin-5-ium iodide.
(z) 6,7,8,8a,9,10-hexahydro-8-p-toluenesulfonamido-7aH-bisbenzothiazolo[3,2-a:3',2'-a']pyrido[3,2-c: 5,6-c']dipyridin-5-ium iodide.
(aa) 6,7,8,8a,9,10-hexahydro-8-thioureido-7aH-bisbenzothiazolo[3,2a:3',2'-a']pyrido[3,2-c:5,6-c']dipyridin-5-ium iodide.
(bb) 6,7,8,8a,9,10 - hexahydro - 8 - (4-oxo-2-thioxo-3-thiazolidinyl) - 7aH - bisbenzothiazolo[3,2 - a:3',2'-a'] pyrido[3,2-c:5,6-c']-dipyridin-5-ium iodide.
(cc) 6,7,8,8a,9,10 - hexahydro - 8 - trimethylammonioacetamido-7aH-bisbenzothiazol[3,2 - a:3',2' - a']pyrido [3,2-c:5,6-c']-dipyridin-5-ium iodide chloride.

The rigidized carbocyanine dyes of this invention are derived from reactive cyclammonium quaternary salts, the preparation of which salts is comprehensively described in a Lincoln and Heseltine application entitled Reactive Quaternary Salts and Their Preparation, Ser. No. 819,946, filed Apr. 28, 1969, and presently copending herewith. Their synthesis is conveniently effected by the reaction of a hydro salt of an alkyl heterocyclic base with an aliphatic organic compound having ethylenic unsaturation between the first and second carbon atoms. The reaction medium is advantageously an inert solvent that exhibits moderate polarity and dissolves both reagents, but which is not a solvent for the reaction product. Exemplary such media are solvents like acetonitrile and dimethylacetamide. No reaction catalysts are generally required and the reaction temperature is conventionally variable from about 20° C. to about 30° C., although wider reaction temperatures can be employed, e.g., reflux conditions, as long as the reagents remain in solution and are not subjected to heating in excess of their decomposition temperatures. The reaction products precipitate from solution and can then be purified by such conventional means as solvent washes or crystallization. As a specific example, 3 - (3,3 - diethoxypropyl)-2-methyl-5-phenylbenzoxazolium bromide is prepared by reacting 2-methyl-5-phenylbenzoxazolium hydrobromide and acrolein diethylacetal in acetonitrile as a solvent. The reaction is carried out at about 25° C. (room temperature) and the reaction product is obtained as a precipitate.

Especially advantageous quaternary salts useful in preparing the rigidized dyes of this invention include those wherein the quaternary nitrogen atom is substituted with a 3,3-dialkoxypropyl substituent, such as the diethoxypropyl species noted above. These salts can be prepared by reacting an acrolein dialkylacetal with the hydro salt of an alkyl cycloammonium base and are desirable for preparation of rigidized dyes of the types described herein where $R^1$ represents an oxygen bridge. These dyes can also be derived from other salts wherein the quaternary nitrogen atom is substituted with a formylethyl radical. In the preparation of corresponding rigidized dyes wherein $R^1$ represents either sulfur or selenium, similar quaternary salts, but having either a sulfur atom or a selenium atom in lieu of the oxygen atom of an acetal or acyl radical, can be conveniently used. Still additional quaternary salts, useful in preparing rigidized dyes wherein $R^1$ represents a nitrogen atom, include salts corresponding to those described previously, but wherein the quaternary nitrogen atom is substituted with either an iminopropyl radical or a hydrazonopropyl radical in cases where, in the resultant rigidized dye, the $R^1$ nitrogen atom is substituted with an amino radical like those described elsewhere. Hydrozono- or iminopropyl quaternary salts can be obtained by reacting either the formylethyl or the dialkoxypropyl species with a hydrazine compound or an amine in an acid medium.

As an intermediate step in the preparation of the described rigidized carbocyanine dyes, cycloammonium quaternary salts having on the quaternary nitrogen atom one of the advantageous substituents noted hereinabove can be condensed by reacting the quaternary salt with the appropriate ortho ester, diethoxyethyl acetate, in a solvent medium to prepare non-rigidized carbocyanine dyes. By suitably substituting the ortho ester, the central or meso-carbon atom of the conjugated methine chain can be advantageously substituted with a variety of substituents, alkyl radicals and aryl radicals, for example, such as those described above as being represented by R. Symmetrical carbocyanine dye precursors prepared by such a condensation reaction are useful intermediates in preparing the subject rigidized carbocyanine dyes.

Symmetrical and non-symmetrical carbocyanine dye intermediates are conveniently prepared by reacting a quaternary salt such as those described hereinabove with a second such quaternary salt wherein the two-position is substituted with a member that can be a vinyl radical, itself substituted with either a halogen atom such as chlorine, an alkyl or aryl mercapto group (e.g., methylmercapto, ethylmercapto, phenylmercapto, etc.) and additionally with alkyl or aryl radicals such as those represented herein by R, or a member having the formula:

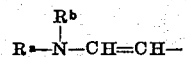

wherein $R^a$ represents an acyl radical, such as acetyl, propionyl, butyroyl, benzoyl, etc. (e.g., an acyl radical having from 2 to 7 carbon atoms) and $R^b$ represents either a hydrogen atom, an alkyl radical, an aryl radical, etc., such as those represented herein by R.

These reactions used to prepare the cyanine dye intermediates are advantageously accelerated by heating the reaction mixture, with temperatures varying from room temperature (about 25° C.) to the reflux temperature of the reaction mixture being satisfactory. The reactions can be carried out in the presence of an inert diluent such as nitrobenzene, methanol, n-propanol, butyrolactone, acetonitrile, chloroform, dimethylformamide, pyridine, acetic anhydride, dimethylacetamide, etc. After dye formation, the resultant product is typically obtained and purified by filtration and recrystallization from an inert diluent such as an alcohol like methanol or ethanol.

To prepare the completely rigidized carbocyanine dyes from the carbocyanine dye intermediates, a portion of the intermediate is admixed in a mild acid solution, such as one of acetic acid, and the mixture is heated, typically under reflux conditions whereupon the rigidized carbocyanine dye precipitates from solution in a form such as dye crystals. Alternatively, the rigidized dyes can be prepared at lower temperatures, but at equivalent rates, using stronger mineral acids, e.g., sulfuric acid. Conventionally, the resultant rigidized dye is collected by means of filter funnel, washed in an inert diluent such as an alcohol like methanol or ethanol and dried. Subsequent purification can be accomplished by washing, recrystallization or another conventional means.

In the case of hydrazonopropyl substituted carbocyanine dye intermediates, the intermediate carbocyanine dye can be prepared having dialkoxypropyl or formylethyl substituents attached to the chromophoric nitrogen atoms intervened by the polymethine chain. Thereafter, the appropriate amine or hydrazine can be included in the acid solution used for preparing the rigidized dye. During the heating step, a two-step reaction is effected, first forming the hydrazono- or imino-substituted open-chain dye which then ring closes to provide a rigidized carbocyanine dye of the present type.

The dyes of this invention, which can be prepared according to processes such as those described hereinabove, are useful in spectrally sensitizing photographic silver halide emulsions when incorporated therein. The dyes are especially useful for extending the spectral sensitivity of the customarily employed silver chloride, silver chlorobromide, silver bromide, silver bromoiodide, and silver chlorobromoiodide developing out emulsions using a hydrophilic colloid carrier or binding agent such as gelatin, its water-soluble derivatives, polyvinyl alcohol, its water soluble vinyl polymers such as polyacrylamide imidized polyacrylimide, etc., and other water-soluble film-forming materials that form water-permeable coatings, such as colloidal albumin, water-soluble cellulose derivatives like ethylanolamine, cellulose acetate, etc.

The binding agents for the emusion layer of a photographic element can also contain dispersed polymerized vinyl compounds. Certain such compounds are disclosed, for example, in U.S. Pats. 3,142,568 of Nottorf issued July 28, 1964; 3,193,386 of White issued July 6, 1965; 3,062,672 of Houck et al. issued Nov. 6, 1962; and 3,220,844 of Houck et al. issued Nov. 30, 1965; and include the water-insoluble polymers and latex copolymers of alkyl acrylates and methacrylates, acrylic acid sulfoalkyl acrylates or methacrylates and the like.

To prepare emulsions sensitized with one or more of the dyes described herein, it is only necessary to disperse the dye or dyes in the emulsions. The methods of incorporating dyes in emulsions are simple and well known to those skilled in the art. In practice, it is convenient to add the dyes to the emulsion in the form of a solution in a suitable solvent. Methanol, ethanol, propanol, etc., acetone and pyridine are used to advantage. The dyes are advantageously incorporated in the finished washed emulsions, and are desirably uniformly distributed throughout the emulsions.

A sensitizing concentration of the dyes in emulsions can vary widely e.g., from 10 to 1000 mg. per mole of silver, based on the silver halide, and will depend upon the type of emulsion and the effect desired. The suitable and most economical concentration for any given emulsion will be apparent to those skilled in the art, upon making the ordinary tests and observations customarily used in the art of emulsion making.

To prepare a hydrophilic colloid-silver halide emulsion sensitized with one or more of the dyes of this invention, one can employ the following procedure. A quantity of dye is dissolved in a suitable solvent, such as an alcohol, acetone, pyridine, etc., and a volume of this solution, which may be diluted with water, containing the dye, is slowly added to, for example, a gelatino-silver halide emulsion, with stirring. Stirring is continued until the dye is uniformly dispersed in the emulsion to inhibit undesirable chemical or physical effects.

The above statements are only illustrative, as it will be apparent that the dyes can be incorporated in photographic emulsions by any of the other methods customarily employed in the art, e.g., by bathing a plate or film upon which an emulsion is coated in a solution of the dye in an appropriate solvent. However, bathing methods are ordinarily not to be preferred.

The emulsions used in the photographic elements of this invention can be further sensitized with chemical sensitizers, such as with reducing agents; sulfur, selenium or tellurium compounds; gold, platinum or palladium compounds; or combinations of these. Suitable procedures are described in Shepard U.S. Pat. 1,623,499; Allen U.S. Pat. 2,399,083; McVeigh U.S. Pat. 3,297,447; and Dunn U.S. Pat. 3,297,446.

The silver halide emulsions described herein can also be protected against the production of fog and can be stabilized against loss of sensitivity during keeping. Suitable antifoggants and the stabilizers each used alone or in combination include the thiazolium salts described in Staud U. S. Pat. 2,131,038 and Allen U.S. Pat. 2,694,716; the azaindenes described in Piper U.S. Pat. 2,886,437 and Heimbach U.S. Pat. 2,444,605; the mercury salts as described in Allen U.S. Pat. 2,728,663; the urazoles described in Anderson U.S. Pat. 3,287,135; the sulfocatechols described in Kennard U.S. Pat. 3,236,652; the oximes described in Carroll et al. British Pat. 623,448; nitron; nitroindazoles; the mercaptotetrazoles described in Kendall et al. U.S. Pat. 2,403,927, Kennard et al. U.S. Pat. 3,266,897 and Luckey et al. U.S. Pat. 3,397,987; the polyvalent metal salts described in Jones U.S. Pat. 2,839,405; the thiuronium salts described in Herz U.S. Pat. 3,220,839; the palladium platinum and gold salts described in Trivelli U.S. Pat. 2,566,263 and Damschroder U.S. Pat. 2,597,915.

As well as including the above-mentioned addenda, the silver halide emulsions employed in this invention can be hardened with any suitable hardener or combinations such as, e.g., formaldehyde, mucochloric acid, glutaraldehyde, maleic dialdehyde, aldehyde hardeners, aziridine hardeners, hardeners which are derivatives of dioxane, vinyl sulfones, oxypolysaccharides such as oxystarch, oxy plant gums, inorganic hardeners such as chromium salts, and the like. Developing agents of the types suitable for inclusion in a silver halide emulsion are described hereinbelow.

The photographic silver halide emulsions or coatings disclosed herein can also contain non-ionic, anionic and/or amphoteric coating aids. Some useful coating aids include, for example, saponin, alkyl substituted aryloxyalkyelene ether sulfonates of the type described in U.S. Pat. 2,600,831 issued June 17, 1952, maleopimarates of the type described in U.S. Pat. 2,823,123, issued Feb. 11, 1958, taurine derivatives of the type described in U.S. Pat. 2,739,891 issued on Mar. 27, 1956, and alkylaminopropionates of the type described in U.S. Pat. 3,133,816 issued May 19, 1964. Still other good coating aids and surfactants which can be employed in the emulsions of this invention include the alkylphenoxy poly(hydroxyalkylene oxides) such as alkylphenoxy poly(glycidols) having from about 5 to about 12 glycidol units, for example, such as those disclosed in British Pat. 1,022,878 issued Mar. 16, 1966, to Olin Mathieson.

Additionally, the rigidized dyes of this invention can be employed in conjunction with other spectral sensitizing dyes to confer additional spectral sensitivity to light-sensitive silver halide emulsions of the types described herein.

Other sensitizing dyes useful in sensitizing such emulsions are described, for example, in Brooker and White U.S. Pat. 2,526,632, issued Oct. 24, 1950; Sprague U.S. Pat. 2,503,776, issued Apr. 11, 1950; Brooker et al. U.S. Pat. 2,493,748; and Taber et al. U.S. Pat. 3,384,486. Spectral sensitizers which can be used include the cyanines, merocyanines, complex (tri or tetranuclear) merocyanines, complex (tri or tetranuclear) cyanines, holopolar cyanines, styryls, hemicyanines (e.g., enamine hemicyanines), oxonols and hemioxonols.

Dyes of the cyanine classes may contain such basic nuclei as the thiazolines, oxazolines, pyrroline, pyridines, oxazoles, thiazoles, selenazoles and imidazoles. Such nuclei may contain alkyl, alkylene, hydroxyalkyl, sulfoalkyl, carboxyalkyl, aminoalkyl and enamine groups and may be fused to carbocyclic or heterocyclic ring systems either unsubstituted or substituted with halogen, phenyl, alkyl, haloalkyl, cyano, or alkoxy groups. The dyes may be symmetrical or unsymmetrical and may contain alkyl, phenyl, enamine or heterocyclic substituents on the methine or polymethine chain.

The merocyanine dyes may contain the basic nuclei mentioned above as well as acid nuclei such as thiohydantoins, rhodanines, oxazolidenediones, thiazolidenediones, barbituric acids, thiazolinones, and malononitrile. These acid nuclei may be substituted with alkyl, alkylene, phenyl, carboxyalkyl, sulfoalkyl, hydroxyalkyl, alkoxyalkyl, alkylamino groups, or heterocyclic nuclei. Combinations of these dyes may be used, if desired. In addition, supersensitizing addenda which do not absorb visible light may be included, for instance, ascorbic acid derivatives, azaindenes, cadmium salts, and organic sulfonic acids as described in McFall et al. U.S. Pat. 2,933,390 and Jones et al. U.S. Pat. 2,937,089.

The additional spectral sensitization by use of other sensitizing dyes can be accomplished by treating the emulsion with a solution of a sensitizing dye in an organic solvent or the dye may be added in the form of a dispersion as described in Owens et al French Pat. 1,482,774. For optimum results, the dye may either be added to the emulsion as a final step or at some earlier stage.

The rigidized cyanine dyes of this invention are also desirable spectral sensitizers for emulsions including color-forming couplers (e.g., such as those described in U.S. Pat. 2,423,730, U.S. Pat. 2,640,776, etc.) and dispersing agents for color couplers, like the substantially water-insoluble, high boiling crystalloidal materials set forth in U.S. Pats. 2,322,027 and 2,303,940.

To prepare photographic elements at least one silver halide emulsion of the disclosed type and containing at least one of the rigidized carbocyanine dyes of this invention is coated onto a typical photographic support material and dried. Coating of single and multi-layer photographic elements can be accomplished by a wide variety of techniques including hopper coating, flow coating, etc. Advantageous support materials include conventional photographic film base materials like cellulose esters such as cellulose nitrate, cellulose acetate, cellulose triacetate, celluolse acetate butyrate, etc., polyolefins like polyethylene, and polypropylene, polycarbonates, polyesters such as poly(ethylene terephthalate) as well as metals such as zinc and aluminum and paper including baryta, polyethylene, and polypropylene coated papers. Other support materials that are suitably used herein are known in the art, e.g., papers coated with copolymers of ethylene-butene.

As well as being useful spectral sensitizing dyes for photographic silver halide, the present rigidized carbocyanine dyes are extremely useful as colorant materials for a wide variety of compositions including coating materials like paints and lacquers, cosmetic preparations (e.g., nail polish, facial colorings, lipstick, etc.), resinous materials, synthetic fibers and the like.

The rigidized dyes can be conveniently incorporated into a coating material to intensify or otherwise modify the color thereof. The amount of dye included depends largely upon the coloring effect desired and can be widely varied in accordance with conventional practice. The dye can be incorporated into the paint or other coating material as a solution of the dissolved dye or as a dye-pigment wherein dye particles or a pre-dye pigment is dispersed in the coating material.

When used as a colorant for resinous materials, the rigidized dyes of this invention can be incorporated, such as by being dissolved or dispersed, into a solution of the resin, the amount of dye used being sufficient to obtain the desired color level. Thereafter, the resin can be coated, extruded, spun, etc., to prepare sheeting fibers or another shaped form. Alternatively, pre-formed resin sheets, filaments or the like can be dipped or otherwise immersed or bathed in a dye solution to obtain the desired coloration. Immersion dying is not preferred where substantially uniform color penetration is desired, unless the resin has a high absorptive capacity for the dye.

In one particular aspect, the resin-dying capability exhibited by the present rigidized carbocyanine dyes is extremely useful for producing dyed fibers, especially fibers formed from synthetic resins. Dying of such fibers is accomplished as previously described, with the essential difference being that the resin melt is spun or extruded into fibers rather than being cast or coated into sheeting.

Resin materials that can be dyed by the rigidized carbocyanine dyes of this invention are widely variable and include such resins as natural resins, modified natural resins and synthetic resins, colophony and shellac. Exemplary suitable modified natural resins are colophony-modified phenol resins and other resins listed below with a large proportion of colophony. Suitable dyeable synthetic resins include the extensive variety of synthetic resins to be useful for fabricating sheeting, fibers and particles, for example colored toner particles in electrophotographic developer compositions. These synthetic resins include polymers such as vinyl polymers including polyvinyl chloride, polyvinlyidene chloride, polyvinyl acetate, polyvinyl acetals, polyvinyl ether and polyacrylic and polymethacrylic esters; polystyrene and substituted polystyrenes or polycondensates, e.g., polyesters, such as phthalate resin, terephthalic and isophthalic acid polyesters, maleinate resin and colophony-mixed esters of higher alcohols; cellulose esters like cellulose acetate, cellulose triacetate and cellulose acetate butyrate; phenol-formaldehyde resins, including colophony-modified phenol-formaldehyde condensates, aldehyde resins, ketone resins, polyamides and polyadducts, e.g., polyurethanes. Moreover, polyolefins, such as various polyethylenes, polypropylenes, polyisobutylenes and chlorinated rubber are also suitable. Additional dyeable resinous materials which are useful are disclosed in U.S. Pats. 2,901,466 and 2,831,826.

The following illustrative examples are included for a further understanding of the invention.

EXAMPLE 1

8-(2 - benzothiazolylamino) - 6,7,8,8a,9,10 - hexahydro-7aH - bisbenzothiazolo[3,2 - a:3',2'-a']pyrido[3,2-c:5,6-c']dipyridin-5-ium bromide

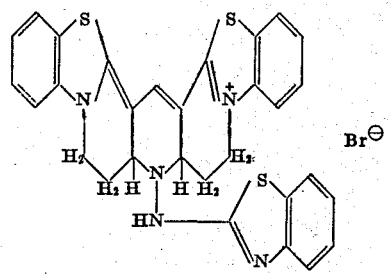

is prepared as follows: 3,3'-di[3-(2-benzothiazolylhydrazono)-propyl]thiacarbocyanine bromide (1 mol., 1.5 g.) is mixed in acetic acid (15 ml.) and the mixture is heated under reflux for two minutes. A new dye crystallizes from solution and collects on a filter funnel, washed well with methyl alcohol, and dried. After refluxing in an excess of methyl alcohol and collecting again on a filter funnel, the yield of dye is 0.5 g. (42%), M.P. 270–271° C. dec.

EXAMPLE 2

A dye as in Example 1, but as the iodide salt, is prepared as follows: 3,3'-di-(3,3-diethoxypropyl)thiacarbocyanine iodide (1 mol., 2.16 g.) is mixed in acetic acid (30 ml.) 2-hydroazinobenzothiazole (2 mols., +10% excess, 1.8 g.) is added and the mixture is heated under reflux ten minutes. The reaction mixture is then cooled, the crystalline dye collected on a filter funnel, washed with acetone and dried. After two recrystallizations from methyl alcohol the yield of pure dye is 0.7 g. (33%), M.P. 291–293° C. dec.

EXAMPLE 3

8-(2 - benzothiazolylamino) - 6,7,8,8a,9,10 - hexahydro-3,13 - diphenyl - 7aH - bisbenzoxazolo[3,2-a:3',2'-a']pyrido[3,2-c:5,6-c']dipyridin-5-ium bromide

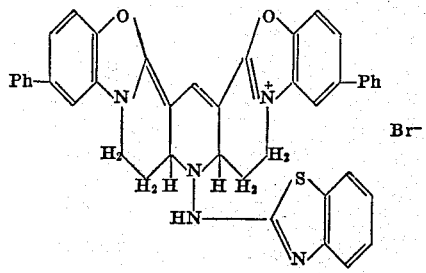

is prepared as follows: 3,3'-di-(3,3-diethoxypropyl-5,5'-diphenyloxacarbocyanine bromide (1 mol., 1.5 g.) is mixed in acetic acid (15 ml.), 2-hydrazinobenzothiazole (2 mols., 0.5 g.) is added and the mixture heated under reflux four minutes. The mixture is cooled, the crystalline dye collected on a filter funnel, washed with methyl alcohol and dried. After two recrystallizations from dimethylacetamide, the yield of pure dye is 0.5 g. (33%), M.P. 300–301° C. dec.

EXAMPLE 4

2,3,13,14-tetrachloro-16,18-diethyl - 6,7,8,8a,9,10 - hexahydro-8-p-toluidino - 7aH - bisbenzimidazo[3,2-a:3',2'-a']pyrido[3,2-c:5,6-c']dipyridin-5-ium iodide

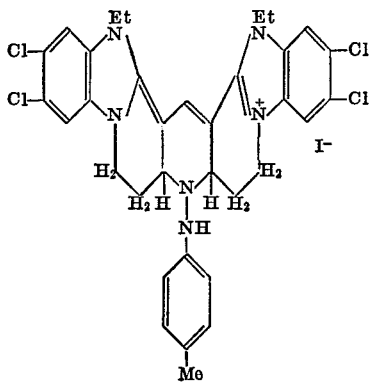

is prepared as follows: 5,6:5',6'-tetrachloro - 3,3' - di(3,3-diethoxypropyl) - 1,1' - diethylbenzimidazolocarbocyanine iodide (1 mol., 1.07 g.) is mixed in acetic acid (10 ml.), p-tolylhydrazine hydrochloride (2 mols. +20% excess, 0.44 g.) added and the mixture heated under reflux for two minutes. The reaction mixture is cooled and the dye precipitated in the decolorized protonated form by adding either (20 ml.) while stirring. The decolorized (protonated) dye is then collected on a filter funnel, placed in ethyl alcohol (10 ml.) and the dye deprotonated by adding 1,1,3,3 - tetramethylguanidine (2 mols., 0.3 g.) with stirring. A white by-product precipitates from solution along with the dye. The dye and white solid are collected on a filter funnel, and the white solid is eliminated by washing the dye crystals on the filter with ethyl alcohol followed by acetone. After two recrystallizations from diemthylacetamide the yield of pure dye is 0.2 g. (21%), M.P. above 315° C.

EXAMPLE 5

6,7,9,10 - tetrahydro - 7aH,8aH - bisbenzothiazolo[3,2-a:3',2' - a']pyrano[3,2 - c:5,6 - c']dipyridin - 5 - ium iodide

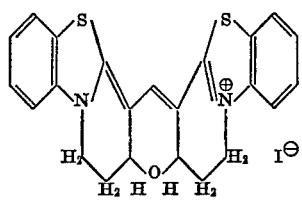

is prepared as follows: 3,3' - bis - (3,3-diethoxypropyl)-thiacarbocyanine iodide (1 mole, 3.5 g.) is mixed in water (8 ml.), with stirring, concentrated sulfuric acid (8 ml.) is added and the solution stirred at 22° C. for ½ hour. The solution is then chilled and stirred into acetone (500 ml.). At this point the acetone is decanted from the viscous residue and the dye obtained as solid by adding a solution of water (200 ml.) containing sodium iodide (2 g.). The solid dye is collected on a filter funnel, washed with water and dried. After refluxing in methyl alcohol (200 ml.) the yield of blue solid is 0.7 g. (27%), M.P. 308–309° C. dec.

EXAMPLE 6

6,7,9,10 - tetrahydro - 17 - ethyl - 7aH,8aH - bisbenzothiazolo[3,2 - a:3',2' - a']pyrano[3,2 - c:5,6-c']dipyridin-4-ium bromide

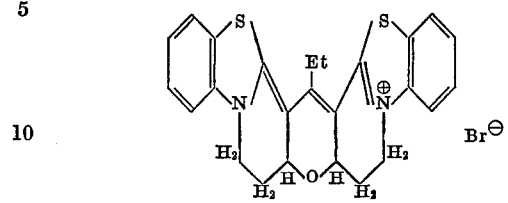

is prepared as follows: 3,3' - bis - (3,3 - diethoxypropyl)-9-ethylthiacarbocyanine bromide (1 mole, 0.5 g.) is mixed in water (3 ml.) with stirring, concentrated sulfuric acid (2.5 ml.) is added slowly and the mixture stirred at 22° C. for ½ hour. The mixture is then cooled and turned into acetone (125 ml.) after which triethylamine (15 ml.) is added with stirring and a blue viscous mass separates from solution. The mass is allowed to settle and the acetone is decanted. The dye is then obtained solid by adding water (50 ml.) containing sodium bromide (3 g.) to the viscous mass with stirring. The solid dye is collected on a filter funnel, washed with an excess of acetone and dried. The yield is 0.1 g. (26%), M.P. 250–253° C. dec.

EXAMPLE 7

6,7,9,10 - tetrahydro - 3,13 - dimethoxy - 7aH,8aH - bisbenzothiazolo[3,2 - a:3',2' - a']pyrano[3,2 - c:5,6-c']dipyridin-5-ium iodide

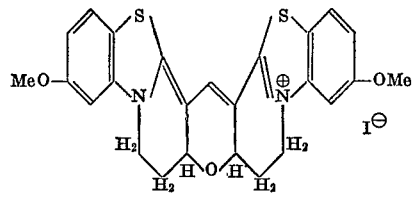

is prepared as follows: 3,3' - bis - (3,3 - diethoxypropyl)-5,5' - dimethoxythiacarbocyanine iodide (1 mole, 2 g.) is stirred in water (5 ml.), concentrated sulfuric acid (5 ml.) is added and the entire mixture allowed to stir at 22° C. for ½ hour. The mixture is then turned into acetone (600 ml.), triethylamine (25 ml.) is added with stirring and the dye separates as a viscous mass. The dye is obtained solid by decanting the acetone and stirring the viscous residue with water (200 ml.) containing sodium iodide (4 g.). The solid dye is collected on a film funnel, washed with acetone and dried. After one recrystallization from ethyl alcohol, the yield of pure dye is 1 g. (71%), M.P. 300–302° C. dec.

EXAMPLE 8

6,7,9,10 - tetrahydro - 17 - ethyl - 3,13 - diphenyl - 7aH,8aH - bisbenzoxazolo[3,2 - a:3',2' - a']pyrano[3,2-c:5,6-c']dipyridin-5-ium bromide

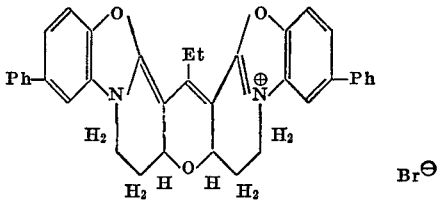

is prepared as follows: 3,3' - bis - (3,3 - diethoxypropyl)-5,5' - diphenyl - 9 - ethyloxacarbocyanine bromide (1 mole, 1 g.) is mixed in water (4 ml.) with stirring, concentrated sulfuric acid (4 ml.) is added and the mixture is stirred at 22° C. for ½ hour. The mixture is then turned into 250 ml. of acetone with stirring, triethylamino (15 ml.) is added and the dye separates from solution as a viscous mass. At this point, the acetone is decanted from the viscous mass and the dye is obtained as a solid by stirring with water (100 ml.) containing sodium bromide (4 g.). After recrystallization from methyl alcohol, the yield of pure dye is 0.1 g. (12.7%), M.P. 258–262° C. dec.

EXAMPLE 9

2,3,13,14 - tetrachloro - 16,18 - diethyl - 6,7,9,10 - tetrahydro - 7aH,8aH - bisbenzimidazo[1,2 - a:1',2' - a']pyrano[3,2 - c:5,6 - c']dipyridin - 5 - ium trifluoroacetate

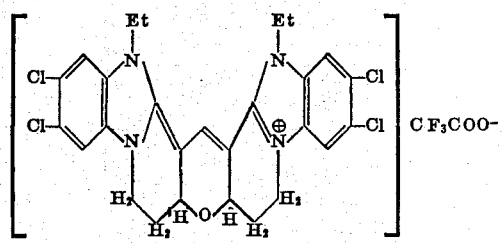

is prepared as follows: 5,6,5',6'-tetrachloro-3,3'-bis-(3,3-diethoxypropyl) - 1,1'-diethylbenzimidazolocarbocyanine iodide (1 mole, 2.1 g.) is wet with water (1.5 ml.) and concentrated sulfuric acid (6 ml.) is added with evolution of heat (iodine also evolves). The mixture temperature reaches 85° C. At this point the mixture is allowed to stir at 22° C. for ½ hour. The protonated mixture is turned into acetone (500 ml.) with stirring, triethylamine (15 ml.) is added and the dye separates from solution as a red solid. The solid dye is collected on a filter funnel, washed with acetone, then with water, again with acetone and dried. The yield of crude sulfate salt is 0.8 g. (40%). The dye as the sulfate salt is converted to the trifluoroacetate salt as follows. The sulfate salt (1 mole, 0.66 g.) is suspended in methyl alcohol (100 ml.) and trifluoroacetic acid (4 moles, 0.45 g.) is added with stirring, then propylene oxide (6 moles, 0.34 g. of is added and the entire mixture stirred at 22° C. overnight. The solid dye is collected on a filter funnel, washed with acetone and dried. The yield of pure dye after two crystallizations from methyl alcohol is 0.3 g. (44%), M.P. 260–261° C. dec.

EXAMPLE 10

8 - (1,1-dioxido-3-[1,2]benzisothiazolylamino)-6,7,8,8a,9,10 - hexahydro - 7aH - bisbenzothiazolo[3,2-a:3'-a']pyrido[3,2-c:5,6-c']dipyridin-5-ium iodide

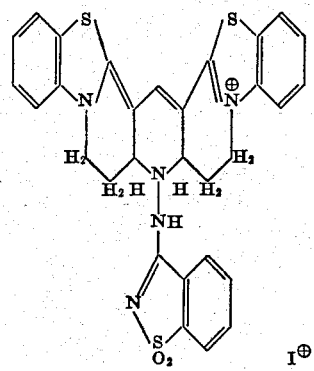

is prepared as follows: 3,3'-bis-(3,3-diethoxypropyl) thiacarbocyanine iodide (1 mole, 0.8 g.) is mixed with 3-hydrazinobenzisothiazole-1,1-dioxide (2 moles, 0.28 g.) in acetic acid (10 ml.) and the mixture is heated under reflux for 10 minutes. The solid dye that separates from solution is collected on a filter funnel, washed with methanol and dried. After being refluxed twice in methanol (50 ml.), the solid is collected on a filter funnel and dried, M.P. 287–290° C. dec.

EXAMPLE 11

6,7,8,8a,9,10 - hexahydro- - 8 - toluenesulfonamide-7aH-bisbenzothiazolo[3,2 - a:3',2' - a]pyrido[3,2-c:5,6-c']dipyridin-5-ium iodide

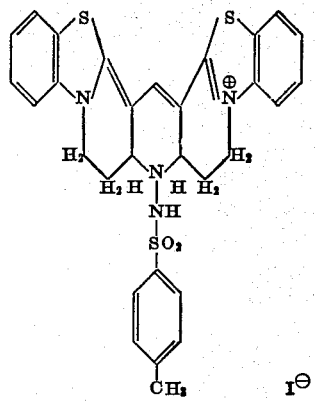

is prepared as follows: 3,3'-bis-(3,3-diethoxypropyl)thiacarbocyanine (1 mole, 0.5 g.) is mixed with p-toluenesulfonhydrazide (2 moles, 0.26 g.) in acetic acid (10 ml.) and the mixture is heated under reflux for 10 minutes. The solid dye that separates from solution is collected on a filter funnel, washed with methanol and dried. After being refluxed in 2 portions of methanol (50 ml.) the yield of solid dye is 0.4 g. (51%), M.P. 335–350° C. dec.

EXAMPLE 12

6,7,8,8a,9,10 - hexahydro-8-thioureido-7aH-bisbenzothiazolo[3,2-a:3',2'-a']pyrido[3,2-c:5,6-c']dipyridin-5-ium iodide

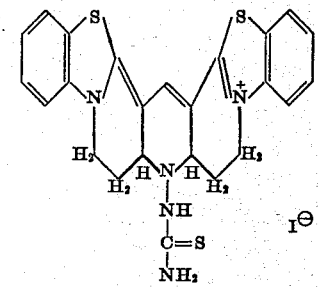

is prepared as follows: 3,3'-bis-(3,3-diethoxypropyl)thiacarbocyanine iodide (1 mole, 0.5 g.) and thiosemicarbazide (1 mole, 0.13 g.) are mixed in acetic acid (5.5 ml.) and the mixture is heated under reflux 3 minutes. The solid dye that separates from solution is collected on a filter funnel, washed with acetic acid and dried. It is obtained essentially pure in 50% yield, M.P. 290–293° C. dec.

EXAMPLE 13

6,7,8,9a,9,10 - Hexahydro - 8-(4-oxo-2-thioxo-3-thiazolidinyl) - 7aH - bisbenzothiazol[3,2 - a:3',2'-a']pyrido[3,2-c:5,6-c']-dipyridin-5-ium iodide

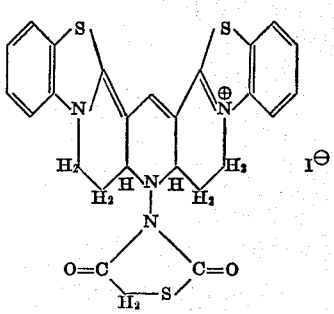

is prepared as follows: 3,3'-bis-(3,3-diethoxypropyl)-thiacarbocyanine iodide (1 mole, 1.0 g.) is mixed with 3-hydrazinorhodanine (2 moles, 0.4 g.) in acetic acid (10 ml.) and the mixture is heated under reflux for 10 minutes. The dye that separates from solution is collected on a filter funnel, washed with more acetic acid and dried. It is isolated esesntially pure 30% yield, M.P 265–267° C. dec.

EXAMPLE 14

6,7,8,8a,10-hexahydro - 8 - trimethylammonioacetamido-7 - aH - bisbenzothiazolo[3,2 - a:3',2'-a']pyrido[3,2-c:5,6-c']dipyridin-5-ium iodide chloride

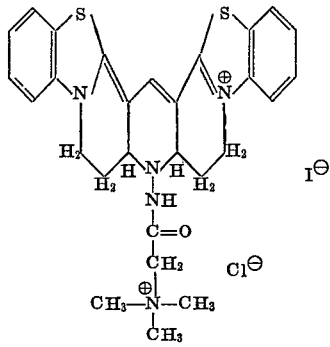

is prepared as follows: 3,3'-bis-(3,3-diethoxypropyl)-thiacarbocyanine iodide (1 mole, 1.0 g.) and carbazoylmethyltrimethylammonium chloride (2 moles, 0.46 g.) are mixed in acetic acid (15 ml.) and the mixture is heated under reflux for 1 minute. The solid dye that separates from solution is collected on a filter funnel, washed with more acetic acid and dried. The yield of dye is 0.6 g. (61%), M.P. 246–250° C. dec.

EXAMPLE 15

A sensitizing amount of each of the dyes from preceding Examples 1 and 3 to 14 is added to a separate portion of gelatino-silver halide emulsion. Each of these emulsion portions is coated on a cellulose ester support and dried to prepare photographic elements. Spectrographic exposures are made on each element and these are processed for 3 minutes at 20° C. in a photographic developer having the formula:

| | Grams |
|---|---|
| p-Methylaminophenol sulfate | 2.0 |
| Sodium sulfite, desiccated | 90.0 |
| Hydroquinone | 8.0 |
| Sodium carbonate·H$_2$O | 32.5 |
| Potassium bromide | 5.0 |
| Water to make 1 liter. | | fixed in a conventional sodium thiosulfate fixing bath, washed and dried. The following table summarizes the wavelength of light to which the maximum sensitivity is produced and the range of wavelength light to which each element is sensitized.

| Example number: | Dye in AgBrI Emul. (mg./m.) | Sensitivity range (nm.) | Sensitivity max. (nm.) |
|---|---|---|---|
| 1 | 200 | 510–650 | 610 |
| 3 | 400 | to 580 | 540 |
| 4 | 600 | 500–610 | 570 |
| 5 | 600 | 550–670 | 610 |
| 6 | 200 | 545–625 | 595 |
| 7 | 400 | 520–655 | 625 |
| 8 | 200 | to 580 | 550 |
| 9 | 200 | 500–600 | 570 |
| 10 | 200 | 510–630 | 600 |
| 11 | 200 | 510–645 | 600 |
| 12 | 200 | 510–635 | 600 |
| 13 | 200 | 520–630 | 600 |
| 14 | 200 | 500–640 | 600 |

EXAMPLE 16

The dyes of Examples 1 and 3 are dissolved in separate portions of a resin melt of methyl methacrylate containing 5% methanol. The resulting dyed melt portions are then polymerized by thermal initiation using 2,2'-azobis-(2-methylpropionitrile) to prepare a dyed poly(methyl methacrylate) reaction products. The dyes in poly(methyl methacrylate) are highly fluorescent and retain the degree of fluorescence exhibited in methanol solution, exhibiting fluorescence quantum yields of .5 (dye of Example 1) and .8 (dye of Example 3). A quantum yield of 1 means that a fluorescent light is emitted for every quantum absorbed by the dye. Yields of less than 1 represent the ratio of emitted light to absorbed light.

EXAMPLE 17

The dye of Example 1 is dissolved in dimethylformamide to prepare a 1% dye solution. Two fabrics composed of synthetic fibers are bathed in the solution for several minutes, the first fabric being of polyacrylonitrile fibers and marketed under the name "Orlon" by E. I. du Pont de Nemours & Co., and the second fabric being of modified acrylic fibers and marketed under the name "Verel" by Eastman Chemical Products, Inc. In each case, the dye is well adsorbed to the fibers and produces uniform coloring of a suitable density.

The invention has been described in detail with particular reference to preferred embodiments thereof, but, it will be understood that variations and modifications can be effected within the spirit and scope of the invention.

We claim:

1. A light-sensitive photographic emulsion comprising a hydrophilic colloid, silver halide grains and a sensitizing amount of a rigidized carbocyanine dye comprising
   (a) two nitrogen-containing nuclei,
   (b) a polyene chain joining said nuclei and consisting of five carbon atoms and an equal number of alternating single and double bonds with three of said five carbon atoms intervening said nuclei and a terminal carbon atom of said polyene chain being in each of said heterocyclic nuclei and attached to a nitrogen atom thereof, and
   (c) the remaining non-metallic atoms necessary to complete, in combination with said nitrogen atoms and said carbon atoms, a nucleus selected from the group consisting of 3,4,5a,6,7,8-hexahydro-4aH-pyrano-[3,2-c:5,6-c']dipyridine and analogs thereof wherein the member in the 5-position is selected from the group consisting of a sulfur atom, a selenium atom and a nitrogen atom.

2. A light-sensitive photographic emulsion comprising a hydrophilic colloid, silver halide grains and a sensitizing amount of a rigidized carbocyanine dye having the formula:

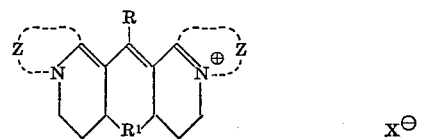

wherein:
   (a) each of Z and $Z^1$ represents the non-metallic atoms necessary to complete a heterocyclic nucleus of the type used in cyanine dyes,
   (b) R represents a member selected from the group consisting of a hydrogen atom, an alkyl radical and an aryl radical,
   (c) $R^1$ represents a member selected from the group consisting of an oxygen atom, a sulfur atom, a selenium atom and a nitrogen atom, and
   (d) $X^\ominus$ represents an anion.

3. A light-sensitive photographic emulsion as described in claim 2 wherein each of the heterocyclic nuclei completed by atoms represented by Z and $Z^1$ is selected from the group consisting of an imidazole nucleus, an oxazole nucleus, a thiazole nucleus, a selenazole nucleus and a quinoline nucleus.

4. A light-sensitive photographic emulsion as described in claim 2 wherein, in the dye, (a) R represents a member selected from the group consisting of a hydrogen atom, an alkyl radical having from 1 to 6 carbon atoms or an aryl radical having from 6 to 10 atoms in a mono- or polycyclic nucleus, and
(b) the nitrogen atom represented by $R^1$ is substituted with a member selected from the group consisting of a hydrogen atom, an alkyl radical having from 1 to 6 carbon atoms; an aryl radical having from 6 to 10 atoms in a mono- or polycyclic nucleus and an amino radical.

5. A photographic emulsion comprising a hydrophilic colloid, silver halide grains and a sensitizing amount of a rigidized carbocyanine dye having the formula

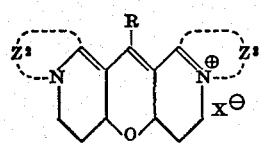

wherein:
(a) each of $Z^2$ and $Z^3$ represents the atoms necessary to complete a heterocyclic nucleus containing a heterocyclic ring of 5 to 6 atoms including the nitrogen atom, with the additional atoms of said heterocyclic ring being selected from the group consisting of carbon, nitrogen, oxygen, sulfur and selenium,
(b) R represents a member selected from the group consisting of a hydrogen atom, an alkyl radical and an aryl radical, and
(c) $X^\ominus$ represents an anion.

6. A photographic emulsion comprising a hydrophilic colloid, silver halide grains and a sensitizing amount of a dye having the formula:

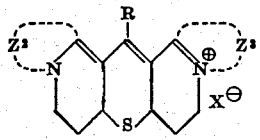

wherein:
(a) each of $Z^2$ and $Z^3$ represents the atoms necessary to complete a heterocyclic nucleus containing a heterocyclic ring of 5 to 6 atoms including the nitrogen atom, with the additional atoms of said heterocyclic ring being selected from the group consisting of carbon, nitrogen, oxygen, sulfur and selenium,
(b) R represents a member selected from the group consisting of a hydrogen atom, an alkyl radical and an aryl radical, and
(c) $X^\ominus$ represents an anion.

7. A photographic emulsion comprising a hydrophilic colloid silver halide grains and a sensitizing amount of a dye having the formula

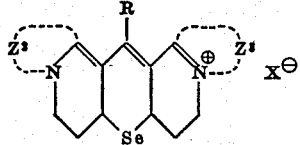

wherein:
(a) each of $Z^2$ and $Z^3$ represents the atoms necessary to complete a heterocyclic nucleus containing a heterocyclic ring of 5 to 6 atoms including the nitrogen atoms, with the additional atoms of said heterocyclic ring being selected from the group consisting of carbon, nitrogen, oxygen, sulfur and selenium,
(b) R represents a member selected from the group consisting of a hydrogen atom, an alkyl radical and an aryl radical, and
(c) $X^\ominus$ represents an anion.

8. A photographic emulsion comprising a hydrophilic colloid, silver halide grains and a sensitizing amount of a dye having the formula:

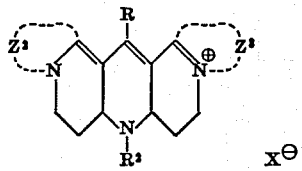

wherein:
(a) each of $Z^2$ and $Z^3$ represents the atoms necessary to complete a heterocyclic nucleus containing a heterocyclic ring of 5 to 6 atoms including the nitrogen atom, with the additional atoms of said heterocyclic ring being selected from the group consisting of carbon, nitrogen, oxygen, sulfur and selenium,
(b) $R^1$ represents a member selected from the group consisting of a hydrogen atom, an alkyl radical and an aryl radical, and
(c) $R^2$ represents a member selected from the group consisting of a hydrogen atom, an alkyl radical having from 1 to 6 carbon atoms, an aryl radical having from 6 to 10 atoms in a mono- or polycyclic nucleus and an amino radical.

9. A photographic emulsion as described in claim 8 wherein the amino radical represented by $R^2$ has the formula:

wherein:
(a) $R^3$, when taken alone, represents a member selected from the group consisting of a hydrogen atom, an alkyl radical having from 1 to 4 carbon atoms, and a phenyl radical,
(b) $R^4$, when taken alone, represents a member selected from the group consisting of an alkyl radical having from 1 to 18 carbon atoms, a phenyl radical, a naphthyl radical, a heterocyclic radical, an arylsulfonyl radical, an acyl radical and a thiocarbmoyl radical, and
(c) $R^3$ and $R^4$, when taken together, represent the nonmetallic atoms necessary to complete a heterocyclyl radical having from 5 to 10 atoms in a mono- or polycyclic nucleus.

10. A light-sensitive photographic silver halide emulsion comprising a hydrophilic colloid, silver halide grains and a sensitizing amount of a rigidized carbocanine dye selected from the group consisting of:

(a) 6,7,9,10-tetrahydro-7aH,8aH-bisbenzothiazolo [3,2-a; 3′,2′-a′]pyrano[3,2-c; 5,6-c′]dipyridin-5-ium iodide,
(b) 6,7,9,10-tetrahydro-17-ethyl-7aH,8aH-biszenezothiazolo[3,2-a; 3′,2′-a′]pyrano[3,2-c; 5,6-c′] dipyridin-5-ium bromide,
(c) 6,7,9,10-tetrahydro-3,13-dimethoxy-7aH,8aH-bisbenzothiazolo[3,2-a; 3′,2′-a′]pyrano[3,2-c; 5,6-c′]dipyridin-5-ium iodide,
(d) 6,7,9,10-tetrahydro-17-ethyl-3,13-diphenyl 7aH,8aH-bisbenzoxazolo[3,2-a; 3′,2′-a′]pyrano[3,2-c; 5,6-o′]dipyridin-5-ium bromide.
(e) 2,3,13,14-tetrachloro-16,18-diethyl-6,7,9,10-tetrahydro-7aH,8aH-bisbenzimidazo[1,2-a; 1′,2′-a′] pyrano[3,2-c; 5,6-c′]dipyridin-5-ium trifluoroacetate,
(f) 5,6,8,9-tetrahydro-3,11-diphenyl-6aH,7aH-bisthiazolo[3,2-a; 3′,2′-a′]pyrano[3,2-c; 5,6-c′] dipyridin-4-ium bromide,
(g) 14-ethyl-5,6,8,9-tetrahydro-3,11-dimethyl-6aH, 7aH-bisoxazolo[3,2-a; 3′,2′-a′]pyrano[3,2-c; 5,6-c′]dipyridin-4-ium-bromide, and (h) 5,6,8,9-tetrahydro-11-methyl-14-(1-naphthyl)-2-phenyl-6aH,7aH-oxazolo[3,2-a]selenazolo[3,2-a']pyrano[3,2-c; 5,6-c']dipyridin-4-ium bromide.

11. A light-sensitive photographic silver halide emulsion comprising a hydrophilic colloid, silver halide grains and a sensitizing amount of a rigidized carbocyanine dye selected from the group consisting of:
 (a) 6,7,9,10-tetrahydro-2,3,13,14-tetramethoxy-7aH,8aH-bisbenzothiazolo[3,2-a; 3',2'-a']thiopyrano[3,2-c; 5,6-c']dipyridin-5-ium bromide,
 (b) 3,13-dichloro-6,7,9,10-tetrahydro-16,18-diphenyl-7aH,8aH-bisbenzimidazolo₁1,2-a; 1',2'-a']thiopyrano[3,2-c; 5,6-c']dipyridin-5-ium bromide,
 (c) 6,7,9,10-tetrahydro-3,13-dimethoxy-17-p-methoxyphenyl-7aH,8aH-bisbenzoxazolo[3,2-a; 3',2'-a']thiopyrano[3,2-c; 5,6-c']dipyridin-5-ium bromide,
 (d) 8,9,11,12-tetrahydro-9aH-10aH-dinaphth[2,1; 4,5:1,2; 4',5']oxazolo [3,2-a]selenazolo[3,2'-a']thiopyrano[3,2-c:5,6-c'} dipyridin-7-ium bromide, and
 (e) 5,6,8,9-tetrahydro-2,3-12-trimethyl-16-propyl-6aH,7aH-benzoxazolo[3,2-a]oxazolo[3,2-a']thiopyrano[3,2-c:5.6-c]dipyridin-4-ium bromide.

12. A light-sensitive photographic silver halide emulsion comprising a hydrophilic colloid, silver halide grains and a sensitizing amount of a rigidized carbocyanine dye selected from the group consisting of:
 (a) 6,7,9,10-tetrahydro-3,13-dimethyl-7aH,8aH-bisbenzoxazolo[3,2-a; 3',2'-a']selenino[3,2-c:5,6-c']dipyridin-5-ium bromide,
 (b) 12-chloro-16-ethyl-5,6,8,9-tetrahydro-2,3-diphenyl-6aH,7aH-benzothiazolo[3,2-a]thiazolo[3,2-a']selenino[3,2-c:5,6-c']dipyridin-4-ium bromide, and
 (c) 3,13-diethoxy-6,7,9,10-tetrahydro-17-methyl-7aH,8aH-bisbenzothiazolo[3,2-a:3',2'-a']selenino[3,2-c:5,6-c']dipyridin-4-ium bromide.

13. A light-sensitive photographic silver halide emulsion comprising a hydrophilic colloid, silver halide grains and a sensitizing amount of a rigidized carbocyanine dye selected from the group consisting of:
 (a) 8-(2-benzothiazolylamino)-6,7,8,8a,9,10-hexahydro-7aH-bisbenzothiazolo[3,2-a:3',2'-a']pyrido[3,2-c:5,6-c']dipyridin-5-ium bromide,
 (b) 6,7,9,9a,8,10-hexahydro-8-trimethylammonioacetamido-7aH-bisbenzothiazolo[3,2-a:3',2'-a']pyrido[3,2-c:5,6-c']dipyridin-5-ium iodide chloride,
 (c) 8-(2-benzothiazolylamino)-6,7,8,8a,9,10-hexahydro-3,13-diphenyl-7aH-bisbenzoxazolo[3,2-a:3',2'-a']pyrido[3,2-c:5,6-c']dipyridin-5-ium bromide,
 (d) 2,3,13,14-tetrachloro-16,18-diethyl-6,7,8,8a,9,10-hexahydro-3,13-diphenyl-7aH-bisbenzimidazo[3,2-a:3',2'-a']pyrido[3,2-d:5,6-c']dipyridin-5-ium iodide,
 (e) 8-phenyl-6,7,8,8a,9,10-hexahydro-7aH-diquino[1,2-a:1',2'-a']pyrido[3,2-c:5,6-c']dipyridin-5-ium iodide,
 (f) 8,17-diethyl-6,7,8,8a,8,10-hexahydro-7aH-bisbenzothiazolo[3,2-a:3'2'-a']pyrido[3,2-c:5,6-c']dipyridin-5-ium iodide,
 (g) 3,13-dichloro-8-(N-methyl-1-naphthylamino)-6,7,8,8a,9,10-hexahydro-7aH-bisbenzothiazolo[3,2-a:3',2'-a']pyrido[3,2-c:5,6-c']dipyridin-5-ium bromide,
 (h) 8-(N-methyloctadecylamino)-16,18-diphenyl-6,7,8,8a,9,10-hexahydro-7aH-bisbenzothiazolo[3,2-a:3',2'-a']pyrido[3,2-c:5,6-c']dipyridin-5-ium-p-toluenesulfonate,
 (i) 7-diphenylamino-14-methyl-3,11-diphenyl-5,6,7,7a,8,9-hexahydro-6aH-bisthiazolo[3,2-a:3',2'-a']pyrido[3,2-c:5,6-c']dipyridin-5-ium bromide,
 (j) 8-(1,1-dioxo-1,3-benzisothiazol-3-ylamino)-6,7,9,8a,9,10-hexahydro-7aH-bisbenzothiazolo[3,2-a:3',2'-a']pyrido[3,2-c:5,6-c']dipyridin-5-ium iodide,
 (k) 6,7,8,8a,9,10-hexahydro-8-p-toluenesulfonamido-7aH-bisbenzothiazolo[3,2-a,3'2'-a']pyrido[3,2-c:5,6-c']dipyridin-5-ium iodide, and
 (l) 6,7,8,8a,9,10-hexahydro-8-(4-oxo-2-thioxo-3-thiazolidinyl)-7aH-bisbenzothiazolo[3,2-a:3',2'-a']pyrido[3,2-c:5,6-c']dipyridin-5-ium iodide.

14. A photographic element comprising a support having coated thereon at least one light-sensitive silver halide emulsion comprising a hydrophilic colloid, silver halide grains and a sensitizing amount of a rigidized carbocyanine dye comprising two nitrogen-containing heterocyclic nuclei, a polyene chain joining said nuclei and consisting of five carbon atoms and having an equal number of alternating single and double bonds with a terminal carbon atom of said polyene chain being in each of said heterocyclic nuclei and attached to a nitrogen atom thereof, and the remaining non-metallic atoms necessary to complete, in combination with said nitrogen atoms and said carbon atoms, a nucleus selected from the group consisting of 3,4,5a,6,7,8-hexahydro-4aH-pyrano[3,2-c:5,6-c]dipyridine and analogs thereof wherein the member in the 5-position is selected from the group consisting of a sulfur atom, a selenium atom and a nitrogen atom.

15. A photographic element comprising a support having coated thereon at least one light-sensitive silver halide emulsion comprising a hydrophilic colloid, silver halide grains and a sensitizing amount of a rigidized carbocyanine dye having the formula:

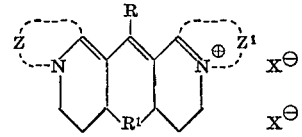

wherein:
 (a) each of Z and Z¹ represents the non-metallic atoms necessary to complete a heterocyclic nucleus of the type used in cyanine dyes,
 (b) R represents a member selected from the group consisting of a hydrogen atom, an alkyl radical and an aryl radical,
 (c) R represents a member selected from the group consisting of an oxygen atom, a sulfur atom, a selenium atom and a nitrogen atom, and
 (d) X⊖ represents an anion.

References Cited
UNITED STATES PATENTS
3,326,688  6/1967  Jenkins et al. _____ 96—120

NORMAN G. TORCHIN, Primary Examiner
E. C. KIMLIN, Assistant Examiner

U.S. Cl. X.R.
96—136; 260—304, 306.8 F, 307.0, 309.2